(12) United States Patent
Woodruff et al.

(10) Patent No.: US 7,166,226 B2
(45) Date of Patent: Jan. 23, 2007

(54) ION EXCHANGE CRYPTANDS COVALENTLY BOUND TO SUBSTRATES

(75) Inventors: L. Andy Woodruff, San Jose, CA (US); Andrei V. Bordunov, Campbell, CA (US); Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 178 days.

(21) Appl. No.: 11/046,477

(22) Filed: Jan. 28, 2005

(65) Prior Publication Data

US 2005/0133453 A1 Jun. 23, 2005

Related U.S. Application Data

(62) Division of application No. 09/949,010, filed on Sep. 7, 2001, now Pat. No. 6,867,295.

(51) Int. Cl.
*C08B 37/16* (2006.01)
(52) U.S. Cl. .................... 210/683; 210/684; 536/103; 540/145; 549/10; 549/347; 549/348
(58) Field of Classification Search ........ 210/683–684; 536/103; 540/145; 549/10, 347, 348
See application file for complete search history.

(56) References Cited

U.S. PATENT DOCUMENTS

| 4,224,415 A | 9/1980 | Meitzner et al. |
| 4,880,923 A | 11/1989 | Brois et al. |
| 4,943,375 A | 7/1990 | Bradshaw et al. |
| 4,952,321 A | 8/1990 | Bradshaw et al. |
| 5,393,892 A | 2/1995 | Krakowiak et al. |
| 5,865,994 A | 2/1999 | Riviello et al. |
| 5,968,363 A | 10/1999 | Riviello et al. |
| 6,200,478 B1 | 3/2001 | Chorush et al. |
| 6,262,257 B1 | 7/2001 | Gale et al. |

FOREIGN PATENT DOCUMENTS

| JP | 55-018434 A | 2/1980 |
| JP | 59-145022 A | 8/1984 |
| JP | 61-033220 A | 2/1986 |
| JP | 4-346064 A | 12/1992 |

(Continued)

OTHER PUBLICATIONS

Babb, D.A., et al., "Synthesis of hydroxymethyl-functionalized diazacrowns and cryptands," *J. Heterocycl. Chem.* 23:609-613 (1986).

(Continued)

*Primary Examiner*—Chester T. Barry
(74) *Attorney, Agent, or Firm*—Dorsey & Whitney; David J. Brezner (57) ABSTRACT

One embodiment of the invention comprises an ion exchange composition formed by reacting unsaturated carbon to carbon moieties pendant from derivatized ion binding cryptands with a support substrate under free radical activation conditions to form a covalent bond therebetween. In another embodiment, a cryptand ion exchange composition is made by covalently bonding unsaturated carbon to carbon moieties pendant from a derivatized ion binding cryptands with unsaturated carbon to carbon moieties pendant from a support substrate under free radical activation conditions to form covalent bond.

10 Claims, 3 Drawing Sheets

30 mM NaOH initially, step change to 30 mM LiOH

Capacity Gradient: Polyphosphonic Acids

FOREIGN PATENT DOCUMENTS

| | | |
|---|---|---|
| JP | WO 98/02224 A1 | 1/1998 |
| JP | 11-043514 | 2/1999 |
| JP | WO 99/28355 A1 | 6/1999 |
| JP | 11-240864 | 9/1999 |
| JP | 2000-356702 | 12/2000 |

OTHER PUBLICATIONS

Blasius, E., et al., "Preparation and application of polymers with cyclic polyether anchor groups," *Pure Appl. Chem.* 54(11):2115-2128 (1982).

Bradshaw, J. S., "Stable silica gel-bound ethers. selective separation of metal ions and a potetnial for separation of amine enantionmers," *J. Incl. Phenomena Mol. Recog. Chem.* 7:127-136 (1989).

Bradshaw, J. S., et al., "Silical gen-bound aza crowns for the selective removal and concentraion of metal ions," *Pure Appl. Chem.* 61:1619-1624 (1989).

Bradshaw, J.S., et al., "Aza-Crown Macrocycles," *The Chemistry of Heterocyclic Compounds*, vol. 51, ed. Taylor, E.C., Wiley, New York, (1993).

Dietrich, B., "Cryptands," in*Comprehensive Supramolecular Chemistry*, 1:154-157, 186, 192, G. Gokel (ed.), Pergamon Books, New York, NY (1996).

Haoyun, A., et al., "Macropolycyclic polyethers (cages) and related compounds," *Chem. Rev.* 92(4):543-572 (1992).

Haoyun, A., et al., "Synthesis and complexation properties of suitcase-shaped macrotricyclic and butterfly-shaped macrobicyclic polyether ligands," *J. Org. Chem.* 57(18):4998-5005 (1992).

Izatt, R.M., et al. "Thermodynamic and kinetic data for macrocycle interaction with cations and anions," *Chem. Rev.* 91:1721-2085 (1991).

Koga, K., "Functionalization of crown ethers: an approach to the enzyme model for peptide synthesis," *Pure Appl. Chem.* 60(4):539-543 (1988).

Krakowiak, K. E., et al., "One-step methods to prepare cryptands and crowns containing reactive functional groups," *J. Heterocycl. Chem.* 27:1011-1014 (1990).

Krakowiak, K.E., et al., "Synthesis of the cryptands. a short review," *Isr. J. Chem.* 32:3-13 (1992).

Krespan, C. G., "Functionalized macroheterobicyclic compounds," *J. Org. Chem.* 45(7):1117-1180 (1980).

Lamb, J.D., et al., "A comparison of gradient capacity anion chromatography using macrocycles D-2.2.2 and D-2.2.1 in constant or variable temperature mode," *Talanta* 39(8):923-930 (1992).

Lamb, J.D., et al., "Chemically suppressed anion chromatography based on macrocycle-cation complexation," *J. Chromatogr.*, 482:367-380 (1989).

Matsui, T., et al., "Functionalized macrocycles. 1. Synthesis of thiol-bearing crown ethers as an approach to regioselective catalysts," *Chem. Pharmac. Bull.* 27(10):2295-2303 (1979).

Montanari, F., et al. "Hydroxymethyl 18-crown-6 and hydroxymethyl [2.2.2]cryptand: versatile derivatives for binding the two polyethers to lipophilic chains and to polymer matrices," *Tetrahedron Lett.* 20(52):5055-5058 (1979).

Montanari, F., et al., "Hydroxymethyl derivatives of 18-crown-6 and [2.2.2]cryptand: versatile intermediates for the synthesis of lipophilic and polymer-bonded macrocyclic ligands," *J. Org. Chem.* 47(7):1298-1302 (1982).

Montanari, F., et al., "Phase-transfer catalytic activity of polymer-supported macrocyclic polyethers," *Br. Polymer J.* 16:212-218 (1984).

Nakajima, M. et al., "Liquid chromatography of alkali and alkaline earth metal salts on poly(benzo-15-crown-5)-and bis(benzo-15-crown-5)-modified silicas," *Anal. Chem.* 55:463-467 (1983).

Niederhauser, T.L., et al., "High-performance anion-exchange chromatographic separations of carbohydrate on a macrocycle-based stationary phase with eluents or relatively low pH and concentration," *J. Chromatogr. A* 804:69-77 (1998).

Smith, R.G., et al., "Use of step gradients of different polymeric substrates in the separation of anions by macrocycle-based ion chromatopgraphy," *J. Chromatogr. A* 671:89-94 (1994).

Watanabe, H. et al., "Synthesis and phase-transfer catalytic activity of novel chiral crown ethers immobilized onto polystyrene supports," *React. Func. Polymers* 37(1):101-109 (Jan. 1998).

Woodruff, A., et al., "Adjustable—capacity anion-exchange separator," *J. Chromatogr. A* 956:35-41 (2002).

Structural representation of grafted polymeric layer

Fig. 1

A) Potassium Hydroxide: 70 mM

B) Sodium Hydroxide: 70 mM

C) Lithium Hydroxide: 70 mM

Fig. 2: Capacity Changes With Cation 30 mM NaOH initially, step change to 30 mM LiOH Fig. 3: Capacity Gradient: Polyphosphonic Acids

ION EXCHANGE CRYPTANDS COVALENTLY BOUND TO SUBSTRATES

CROSS-REFERENCE TO RELATED APPLICATIONS

This application is a divisional application of pending U.S. application Ser. No. 09/949,010 filed Sep. 7, 2001 now U.S. Pat. No. 6,867,295

FIELD OF THE INVENTION

The present invention relates to cryptands covalently bound to a support substrate for uses such as in ion exchange chromatography.

BACKGROUND OF THE INVENTION

Cryptands and other macrocyclic compounds such as crown ethers, spherands, cryptahemispherands, cavitands, calixarenes, resorcinorenes, cyclodextrines, porphyrines and others are well known. (*Comprehensive Supramolecular Chemistry* Vol. 1–10, Jean-Marie Lehn—Chairman of the Editorial Board, 1996 Elsevier Science Ltd.) Many of them are capable of forming stable complexes with ionic organic and inorganic molecules. Those properties make macrocyclic compounds candidates for various fields, for instance, catalysis, separations, sensors development and others. Cryptands (bicyclic macrocycles) have extremely high affinity to metal ions. The cryptand metal ion complexes are more stable than those formed by monocyclic ligands such as crown ethers (Izatt, R. M., et al., *Chemical Reviews* 91:1721–2085 (1991)). This high affinity of the cryptands to alkaline and alkaline earth metal ions in water makes them superior complexing agents for the processes where strong, fast and reversible metal ion binding is required. Examples of these processes include separation, preconcentration and detection of metal ions, analysis of radioactive isotopes, ion-exchange chromatography, phase-transfer catalysis, activation of anionic species and others.

Adding moieties with functionality to macrocyclic compounds permits binding of the derivatized macrocycles onto support substrates to provide surface functionalization. Physical adsorption and covalent attachment are two common methods of binding. Cryptand adsorbed polymers have been reported as stationary phases for ion exchange chromatography (Lamb, J. D., et al., *J. Chromatogr.*, 482: 367–380 (1989); Niederhauser, T. L., et al., *Journal of Chromatography A*, 804:69–77 (1998); Lamb, J. D., et al., *Talanta*, 39 (8):923–930 (1992); and Smith, R. G., et al., *Journal of Chromatography A*, 671:89–94 (1994).

The majority of adsorbed materials have limited number of applications due to their incompatibility with the solvents that elute the adsorbed functional layer. There is also a restriction on using these materials at elevated temperatures. Covalent attachment reduces these problems. Previously reported substrates with covalently attached macrocycles include silica gel, polymeric resins, thin films and others (Blasius, E., et al., *Pure & App. Chem.* 54 (11):2115–2128 (1982); Montanari, F., et al., *British Polymer Journal*, 16:212–218 (1984); U.S. Pat. No. 5,393,892 to Krakowiak, et al.; U.S. Pat. No. 4,943,375 to Bradshaw, et al.; U.S. Pat. No. 5,968,363 to Riviello, et al.; JP Patent No. 55018434A2 to Kakiuchi, et al.; JP Patent No. 59145022A2 to Fujine, et al.; JP Patent No. 61033220A2 to Fujine, et al.; JP Patent No. 4346064A2 to Watanabe, et al.; and PCT Publication W099/28355 to Darling, et al.

Many strategies for the synthesis of macrocyclic compounds have been developed over the years (*Comprehensive Supramolecular Chemistry* Vol. 1–10, Jean-Marie Lehn—Chairman of the Editorial Board, 1996 Elsevier Science Ltd.; Krakowiak, K. E., et al., *Israel Journal of Chemistry* 32:3–13 (1992); Bradshaw, J S., et al., "Aza-Crown Macrocycles," *The Chemistry of Heterocyclic Compounds*, Vol. 51, ed. Taylor, E. C., Wiley, New York, 1993; Haoyun, A., et al., *Chemical Reviews* 92:543–572 (1992)). However, the synthesis of functionalized macrocycles is difficult. Hydroxy, amino and carboxylic groups added to linear precursors before the ring closure step are commonly used functionalities for derivatization of macrocycles. Most of the synthetic procedures imply protection of these groups prior to cyclization. Protected groups are chemically transformed into desired functions after the macroring is constructed (Krespan, C. G., *Journal of Organic Chemistry* 45:1177–1180 (1980); Montanari, F., et al., *Journal of Organic Chemistry* 47:1298–1302 (1982); Haoyun, A., et al., *Journal of Organic Chemistry* 57:4998–5005 (1992)). This methodology can impose considerable limitations on synthesis and purification of functionalized macrocycles, especially bicyclic and polycyclic compounds. Synthetic difficulties can lead to low overall yields and high production costs of these materials.

Macrocyclic compounds containing allylic functionalities are known from prior art (Krakowiak, K. E., et al., *Journal of Heterocyclic Chemistry* 27:1011–1014 (1990)). Some of them were further hydrosilated and attached to silica solid supports (Bradshaw, J. S., et al., *Pure & Appl. Chem.* 61:1619–1624 (1989); Bradshaw, J. S., et al., *Journal of Inclusion Phenomena and Molecular Recognition in Chemistry* 7:127–136 (1989)). The synthesis of allyl containing [2.2.2] cryptand 1 has been reported (Babb, D. A., et al., *Journal of Heterocyclic Chemistry* 23:609–613 (1986)).

The methods for covalent attachment of the cryptands to polymeric substrates are based mostly on the interaction of active layer of a substrate, for example, benzyl chloride groups with hydroxyl or amino functionalized cryptand molecules (Montanari, F., et al., *J. Org. Chem.*, 47:1298–1302 (1982); Montanari, F., et al., *British Polymer Journal*, 16:212–218 (1984) and Montanari, F., et al., *Tetrahedron Letters*, No 52, 5055–5058 (1979)). This interaction also involves the side process—formation of the quaternary centers from the tertiary nitrogens of the macrocycle (Montanari, F., et al., *British Polymer Journal*, 16:212–218 (1984). Quaternisation causes extended decomposition of the macrocycle via Hofmann degradation reducing the capacity of the anion exchange stationary phase. An amide group is another linker reported for a covalent functionalization of the substrates with cryptand molecules (Montanari, F., et al., *British Polymer Journal*, 16:212–218 (1984). Amides do not withstand the extremely high pHs used in anion exchange chromatography. Moreover, most of the described synthetic for producing hydroxyl or amino functionalized cryptands, are not practical to satisfy the requirements of industrial scale production.

There is a need to provide an improved method for covalent bonding of cryptands to a substrate for uses such as a chromatographic separation medium to separate anions.

SUMMARY OF THE INVENTION

One embodiment of the invention comprises an ion exchange composition formed by reacting unsaturated carbon to carbon moieties pendant from derivatized ion binding cryptands with a support substrate under free radical activation conditions to form a covalent bond therebetween.

In another embodiment, a cryptand ion exchange composition is made by covalently bonding unsaturated carbon to carbon moieties pendant from a derivatized ion binding cryptands with unsaturated carbon to carbon moieties pendant from a support substrate under free radical activation conditions to form covalent bond.

DETAILED DESCRIPTION OF THE PREFERRED EMBODIMENTS

In one aspect of the present invention, an ion exchange composition is formed by reacting unsaturated carbon to carbon moieties pendant from a derivatized ion binding cryptand C with a support substrate under free radical activation conditions.

In one embodiment, the cryptand pendant unsaturated carbon to carbon moiety is on a styrenic group which has been appended to the cryptand by techniques such as described below. The properties of cryptands are well known as ion exchange compositions. As set forth in the publications described above, cryptands bind with cations such as potassium, sodium, rubidium, calcium, strontium, barium, thallium and to a lesser degree with cesium, magnesium and lithium and form an anion exchanger according to well known principles. The concentration of complexed cation is directly proportional to the binding constant K, also known as the stability constant. If these macrocycles are attached to a support such as a conventional chromatographic stationary phase, and subsequently complexed with certain cations, anion exchange chromatography can be achieved.

Figure 1:
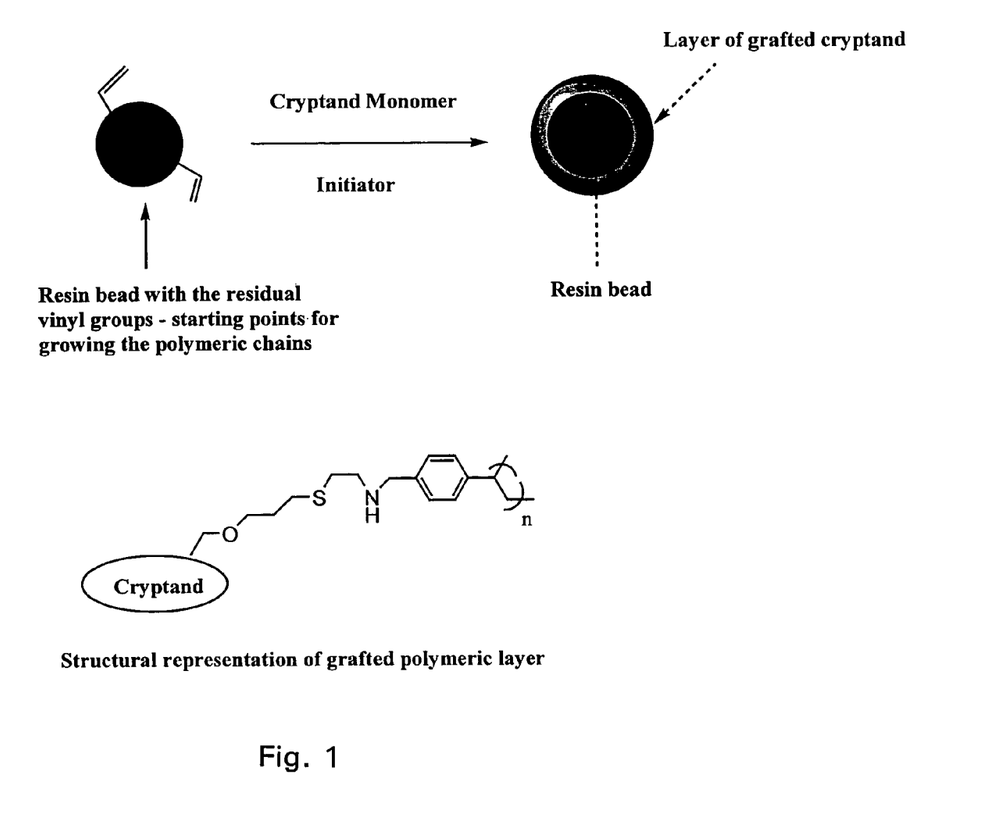
FIG. 1 is a schematic representation of an ion exchange composition according to the present invention.

One advantage of the reaction schemes of the present invention is that individual multiple (e.g., $4 \times 10^{14}$ to $4 \times 10^{16}$ or more) strands of derivatized macrocycle compounds (e.g., cryptands) per square meter can be bound to each support particle and projecting therefrom as illustrated in FIG. 1. This provides a substantial quantity of macrocycle compounds in a format which is readily accessible to the approach of both cationic and anionic species in an aqueous environment. Prior art based on adsorbed macrocycle compounds provides very limited capacity due to the restriction that this species must be adsorbed as a monolayer on a hydrophobic surface. Presenting the macrocycle compounds as a brush polymer extending into the aqueous solution surrounding each support particle, permits significantly better diffusion kinetics than can be observed with adsorbed monolayer coatings of macrocycle compounds, while at the same time allowing for significantly higher capacity than is possible with an adsorbed monolayer coating. Furthermore, positioning the macrocycle compounds in the proximity of a hydrophobic surface compromises the chromatographic performance of materials based on adsorbed macrocycle compounds. Anionic hydrophobic compounds exhibit poor chromatographic efficiency when that retention site is located in the proximity of a hydrophobic surface unless organic solvent is added to the mobile phase. Of course, incorporating an organic solvent into mobile phase flowing past the support particles is incompatible with the prior art adsorbed monolayer coatings because such organic solvent will slowly wash the adsorbed coating away. While the composite material derived from support particles which had been covalently derivatized with macrocycle brush polymers are compatible with organic solvents, the high cost of organic solvents and the high cost of disposal of organic solvents make the use of organic solvents highly undesirable. Thus, the brush polymer configuration described above provides superior chromatographic properties without the need for the addition of organic solvent and the incumbent disadvantages of its use.

In one preferred embodiment, the covalent bond is formed between the cryptand pendant moieties and an unsaturated carbon to carbon moiety pendant from the polymeric substrate under free radical conditions. For example, the cryptands can be bound to resin beads such as cross-linked polystyrene resin for use in a packed bed for an ion exchange column. The form of the bed and the characteristic composition of the resin can be of the type sold by Dionex under the IONPAC® product line. In a particularly effective ion exchange composition of this type, the cryptand is derivatized to include a pendant styrenic group which forms the covalent bond.

In a further embodiment, the only ion binding moiety bound to the polymeric substrate is a cryptand.

The vinyl moiety of the styrenic terminal group is readily attached under free radical conditions to polymeric substrate particles including terminal groups with ethylenic unsaturation as described in U.S. Pat. No. 5,865,994.

In another embodiment, the support substrate includes hydrogen atoms which are abstractable under hydrogen abstraction conditions to form a covalent bond with the cryptand pendant unsaturated moiety. Suitable conditions for this reaction include free radical activation as disclosed in U.S. Pat. Nos. 6,074,541 and 5,792,331.

An anion exchange column of the foregoing type can perform a variety of anion exchange separations ranging from common anions such as fluoride, chloride, sulfate, nitrite, bromide, phosphate and nitrate; hydrophobic anions such as thiosulfate, iodide, thiocyanate and perchlorate; organic acids such as formic, acetic, glycolic, quinic acids. Polyvalent ions such as polyphosphates, oligonucleotides, and oligosacarrides at high pH can also be separated with this column.

Figure 2:
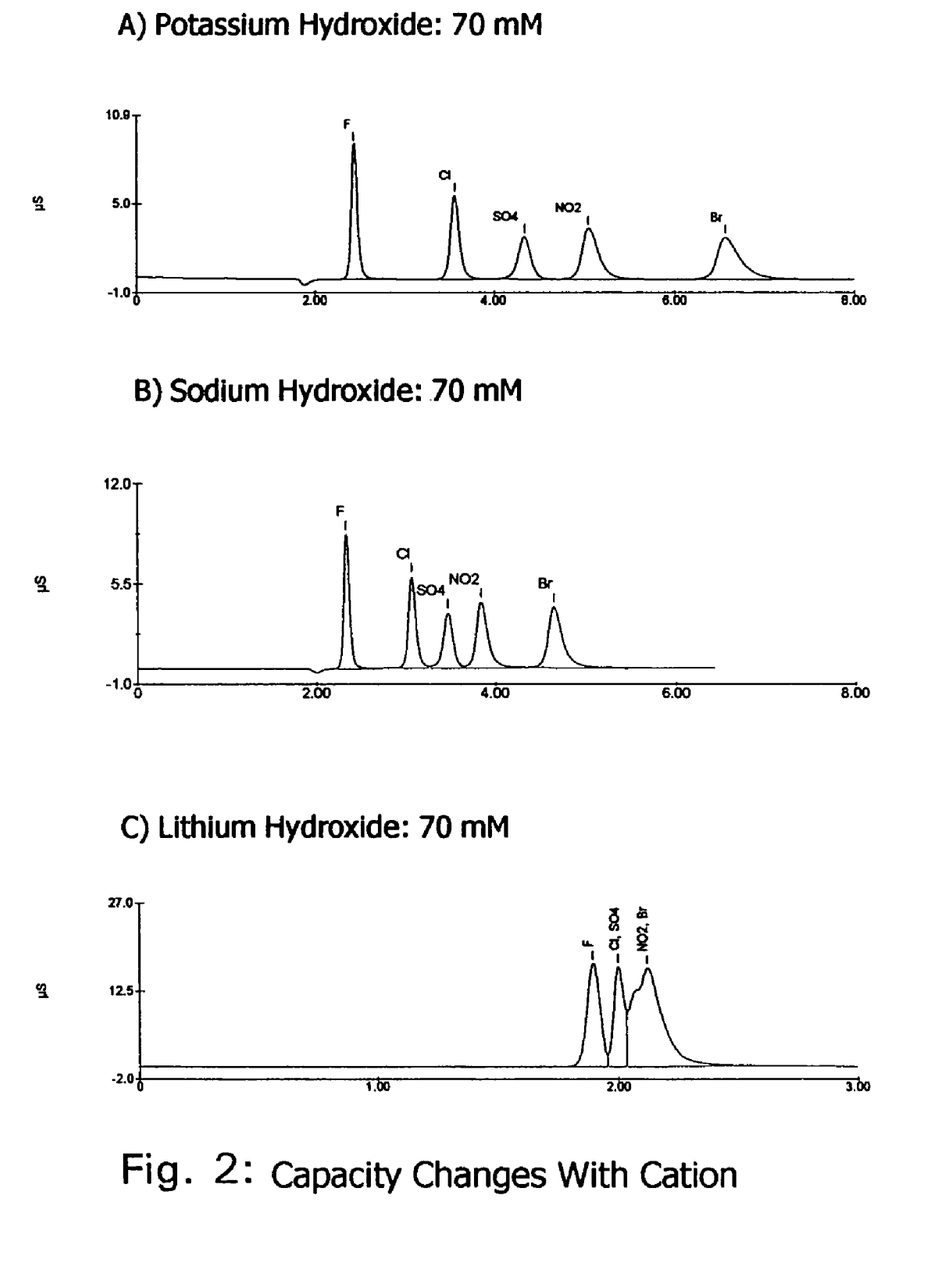
FIGS. 2 and 3 are chromatograms illustrating uses of the ion exchange composition of the present invention.

The conditions for separation of anions using cryptands are well known. (Lamb, J. D., et al., *J. Chromatogr.*, 482:367–380 (1989); Niederhauser, T. L., et al., *Journal of Chromatography A*, 804:69–77 (1998); Lamb, J. D., et al., *Talanta*, 39 (8): 923–930 (1992); and Smith, R. G., et al., *Journal of Chromatography A*, 671:89–94 (1994). An example is shown in FIG. 2 where the separation of seven common anions is accomplished using conventional suppressed anion exchange techniques. Here we see the separation of fluoride (peak 1), acetate/formate (peak 2), chloride (peak 3), sulfate (peak 4), nitrite (peak 5), bromide (peak 6), phosphate (peak 7), and nitrate (peak 8) using a mobile phase of 70 millimolar sodium hydroxide.

As set forth above, in one embodiment a monomeric cryptand is grafted onto the support substrate (stationary phase) using a free radical initiator to produce a covalently bound functionality. This stationary phase is stable when used with aqueous or organic mobile phases. Bicyclic and tricyclic aliphatic and aromatic cryptand molecules containing nitrogen and oxygen heteroatoms or only oxygen heteroatoms or only nitrogen heteroatoms or incorporated heterocyclic fragments for metal ion binding can also be applied as modifiers. Other polymerizable cryptand compounds such as their styrenic, allylic, acrylic, methacrylic and any other alkene and alkyne derivatives can be used for grafting. Once the cryptand is attached by a covalent bond by this or any of the methods possible to form such bonds, the cryptand can now be utilized as a stable functional group for anion exchange chromatography.

Anion exchange mobile phases are typically basic solutions such as sodium or potassium hydroxide (or carbonate). Elution of anions occurs via competition between the mobile phase anion such as hydroxide or carbonate and the sample anions for cation exchange sites on the stationary phase. In conventional suppressed anion exchange chromatography, the associated cation typically plays a negligible role in the process. In cryptand based anion exchange, the cation plays a crucial role. It generates the anion exchange site, and depending on the cation, determines the capacity and selectivity of the stationary phase.

For example, if a basic mobile phase such as potassium hydroxide is used with [2.2.2] cryptand resin, a high capacity stationary phase is created since potassium has a high binding constant relative to sodium or lithium. If a mobile phase such as sodium hydroxide is used, a lower capacity stationary phase is now created since sodium has a lower binding constant. A low capacity phase is generated if lithium hydroxide is used as the mobile phase since lithium has a low affinity for the [2.2.2] cryptand. The capacities decrease as expected based on the binding constants of the 2,2,2 cryptand with potassium, sodium, and lithium cations.

According to the present invention, the macrocycle is permanently attached to a support substrate and will not slowly bleed off an ion exchange column when using aqueous eluents or eluents which contain solvents.

Another advantage is the ability to rapidly restore columns whose performance has been compromised by contamination with polyvalent ions. This can be done by using a very low capacity mode with no substantial affinity for these ions. Under these conditions, the polyvalent contaminants easily elute off the column and the original performance is restored.

Conventional anion exchange columns have a fixed capacity and selectivity, which cannot be adjusted. In the present invention, one has the ability to vary the anion exchange capacity by changing the cation complexed with the cryptand.

Selectivity to a lesser degree can also be adjusted by these mobile phase changes. This feature allows the user to modify the column performance relative to the sample being analyzed simply by the choice of mobile phase.

Figure 3:
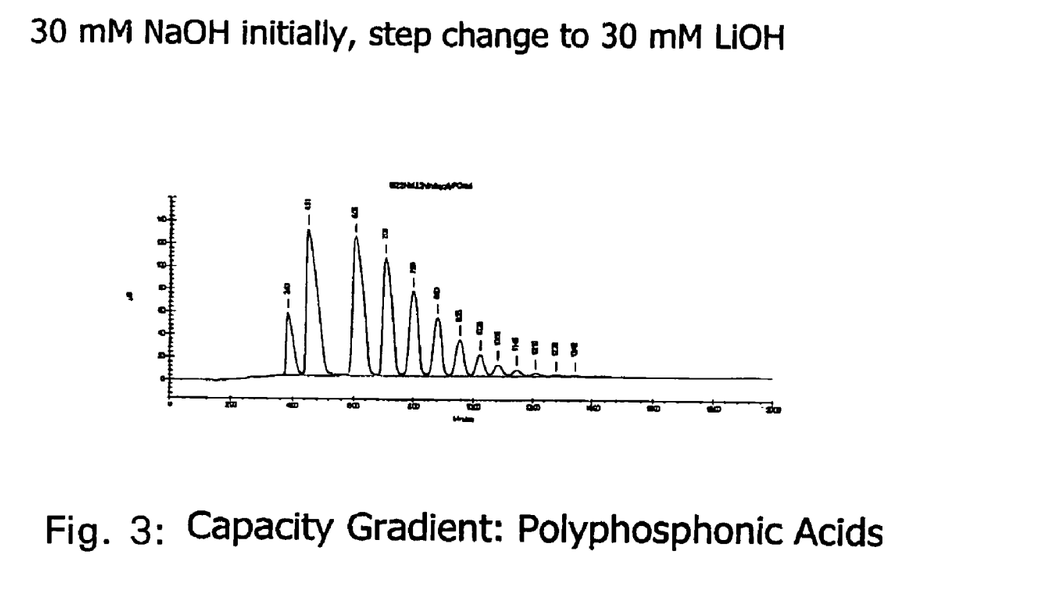

Not only can the capacity be adjusted for a single analysis, but it can also be varied during an analysis by using a higher capacity mobile phase at the beginning and then changing to a lower capacity format by either a step change or a gradient. An example of this is shown in FIG. 3 where the initial mobile phase is sodium hydroxide and then a step change is made to a lithium hydroxide mobile phase, which is a very low capacity form. The first peaks eluting off are low valency polyphosphates and the run ends with the elution of high valency ions.

The benefit of this approach is that it allows one to elute very high valency ions without having to increase the mobile phase ionic concentration. The total ionic concentration throughout the run is only 30 mM, a relatively low concentration.

This technique is known as "gradient capacity ion chromatography" (2,3) chromatography (Lamb, J. D., et al., *J. Chromatogr.*, 482:367–380 (1989); Lamb, J. D., et al., *Talanta*, 39 (8):923–930 (1992);

Traditional anion exchange columns require very high concentration mobile phases when analyzing polyvalent ions such as polyphosphates, oligosacarrides, oligonucleotides, etc. The concentrations needed sometimes exceed the ability of a suppressor to suppress. By using a cryptand based column one can eliminate large baseline changes often seen with steep gradients or step changes with conventional approaches.

One mode for forming a derivatized cryptand is disclosed in Bordunov, et al. application, entitled "A Derivatized Macrocycle Compound for Covalent Bonding to a Substrate and Method of Forming and Use," filed simultaneously herewith. As disclosed therein, cryptands C are derivatized by the use of a sulfur-containing derivatizing agent to form a product which includes a terminal functional moiety R bound, directly or indirectly, to C. R is capable of covalently binding to a support substrate or of being converted into a form capable of covalently binding to such a substrate. In general, the derivatized C has the following structure:

(1)

wherein C is a molecular framework monocyclic or polycyclic cryptand moiety containing at least 12 atoms in each cycle;

L is a substituted or unsubstituted carbon chain linker covalently bound to C including at least one carbon atom in a structure selected from the group consisting of an aliphatic, aromatic or heterocyclic linker including heteroatoms substituted for hydrogen atoms on the linker;

R is a terminal functional moiety capable of covalent binding to a support substrate or of being converted into a functional moiety capable of covalent binding to a solid support substrate;

X and Y are moieties selected from the group consisting of protons, aliphatic groups, aromatic groups, optionally including heteroatoms, substituted for hydrogen atoms in the moieties, selected from the group consisting of oxygen, nitrogen, sulfur, or phosphorus heteroatoms; and S is sulfur.

Suitable macrocyclic compounds C are monocyclic, bicyclic, tricyclic or polycyclic molecular frameworks. Examples of such macrocyclic compounds include crown ethers, cryptands, spherands, cryptahemispherands, cavitands, calixerenes, resorcinorenes, cyclodextrines and porphyrines such as of the type described above. According to the invention, the R group in structure (1) can be covalently bound in one or more steps to a support substrate Z to form the following structure:

(3)

the transformation of R or functional group derived from R results in the formation of linker $R_1$ during functionalization of Z. $R_1$ is a covalent linker between S and Z. It can be a substituted or unsubstituted carbon chain including at least one carbon atom in a structure selected from the group consisting of an aliphatic, aromatic or heterocyclic linker including heteroatoms substituted for hydrogen atoms on the linker. Although $R_1$ is illustrated to be directly bound to Z, it can be bound to an intermediate compound which is capable of covalent binding to Z, as shown in reactant scheme (5). Thus, the —$R_1$—Z linkage of structure (3) encompasses a direct and indirect bonding and does not exclude such an intermediate linkage.

Any support substrate Z can be used so long as C in structures (1)–(3) is capable of performing its desired function, e.g., to serve as an ion exchanger. One form of structure (3) is a packed bed of particles of derivatized macrocycle compound covalently bound to substrate Z. Suitable substrates include organic or inorganic materials such as cross-linked and uncross-linked polymers, resins, organic or inorganic monoliths, sol-gels, other forms of gels such as silica gels, inorganic supports such as zeolites, aluminum oxide, titanium dioxide, zirconium based supports, glasses, carbon black, activate carbon, carbon nanotubes, fibers, pyrolized materials, organic and inorganic crystals, liquid crystals, colloids, nanoparticles, organic and inorganic gels, latexes, foams, membranes and films. Also, Z may be in the form of monolayers such as surfaces of chips, silicon wafers, the walls of capillaries used for gas, liquid, capillary and ion exchange chromatography, capillary electrophoresis, separation, extraction, solid phase extraction, filtration, purification, transport, complexation, molecular and ion recognition, concentration, sensing an analysis of organic and inorganic molecules and ions and also for catalysis, phase transfer catalysis, solid phase synthesis or for other applications.

One particularly useful macrocycle comprises a cryptand bound to a support substrate such as resin copolymer particles in a flow-through ion exchange bed, e.g., using the cryptand functional bed for anion exchange chromatography.

According to one embodiment of the present invention, a macrocyclic compound C is derivatized to include a pendant reactive moiety such as an allylic group by well known methods as described above. C is defined to include such reactive moieties which are capable of bonding to HSR as described below. Thus, the HSR reagent is covalently bound to C to form an intermediate product of the type shown in structure (1) in which the R group is covalently bound to the macrocycle indirectly through the sulfur atom S. As set forth above, the R group can be in a functional form suitable for direct or indirect covalent attachment to the support substrate in a single or multiple steps. Scheme (4) illustrates the derivatization of macrocyclic compound (2) with HSR under the conditions of free radical addition. In a particular case compound (2) is the cryptand with the allylic pendant moiety.

Scheme (4)

-continued

In structure (1), S is connected to the macrocycle C through the intermediate linker L including at least one carbon atom. In structure (2), L is disposed between C and an unsaturated carbon to carbon bond U which interconnects L and the terminal carbon atom bound to Y. The purpose of linker L is to incorporate function U into the macrocycle C.

In one embodiment, the unsaturated carbon to carbon bond, e.g., a —C=C (double bond) or —C/C—(triple bond) described as U in (2) serves as the reacting site for free radical addition of HSR to C through the terminal group U distal to C. The unsaturation is preferably provided by the double bond, e.g., a terminal allyl group. Linker L may be attached to C at any site that does not significantly affect the ability of the macrocycle to provide the desired function, e.g., to complex with an ion of interest. Thus, for a cryptand, the attachment would not significantly affect binding of the cation or its associated anion. As described above, the backbone of the linker L is preferably from about 1 to about 20 atoms in length, preferably from 3 to 8 atoms in length. The linker chain may be straight chained or branched and it may also include saturated or unsaturated carbon atoms for heteroatoms substituted for hydrogen atoms on the linker including oxygen, nitrogen, sulfur or phosphorus. Usually the linker group will contain from 1 to 3 heteroatoms. The heteroatoms may be placed in the linker chain at positions where they will have no significant adverse affect on the ion separation characteristics of the composition. The linker group L can be similar to the corresponding linker L in U.S. Pat. No. 5,865,994, incorporated herein by reference.

Conditions suitable for free radical attachment of the HSR group to a pendant unsaturated group on the macrocycle by free radical initiation are well known in the art. For example see Griesbaum, K, Angew. Chem. Internat. Edit. Vol. 9, No. 4, 273–287 (1970).

In one embodiment of the reaction scheme (4), R is in a form capable of direct covalent attachment to a support substrate without converting R to a form capable of covalent attachment. The conversion of R such as protection/deprotection reactions might be necessary to keep R intact during the reaction (4). Another reason for an optional protection/deprotection of R is to prevent the interference of group R with the course of reaction (4). The example of the protection/deprotection of R is using a carboxylic acid in a form of ester protected R group in reaction (4) followed by its conversion (deprotection) to carboxylic acid upon hydrolysis, prior to its attachment to a substrate. The groups R suitable for a direct covalent attachments to a support substrate with the possible use of protection/deprotection include proton, amines, epoxides, aldehydes, ketones, alcohols, phenols, thiols, carboxylic acids, thiocarboxylic acids, amides and esters of carboxylic and thiocarboylic acids, phosphoric and phosphoric acids, esters of sulfonic acids.

Reaction schemes such as reported earlier (Montanari, F., et al., J. Org. Chem., 47:1298–1302 (1982); Montanari, F., et al., British Polymer Journal, 16:212–218 (1984) and Montanari, F., et al., Tetrahedron Letters, No 52, 5055–5058 (1979)) may be used for a direct functionalization of a support substrate with the cryptand modifier. One of the described approaches is the reacting hydroxymethyl functionalized cryptand with the chrolomethyl polystyrene polymer in presence of the base. Some disadvantages of this and other previously reported methods for a direct covalent attachment of the cryptands are described above.

There are at least two ways of indirect attachment of (1) to a support substrate. The first method is the conversion of R to a group capable of covalent binding to a substrate under non radical conditions to form structure (3). The example of this approach can be a conversion of (1) where R is the alcohol moiety. The alcohol group can be easily transformed into a tosyl or mesyl derivative which reacts with the deprotonated hydroxyl groups of a support substrate to form a covalent link $R_1$. Functional groups that can be prepared by conversion of R for the further non radical covalent attachment to a substrate include amines, epoxides, aldehydes, ketones, alcohols, phenols, thiols, carboxylic acids, thiocarboxylic acids, amides and esters of carboxylic and thiocarboxylic acids, phosphoric and phosphoric acids, esters of sulfonic acids, acyl halides, alkyl and aryl halides and activated carboxylic acids.

A second method of indirect attachment of (1) to a support substrate is the conversion of group R into polymerizable moiety followed by its covalent binding to a substrate under free radical conditions. The indirect attachment of the below specific reaction scheme (5) illustrates a two-step procedure in which —SR in the HSR reagent first is bonded through linker L to C. Then, in a second step, the bound R is reacted with another reagent to form a pendant group on R capable of covalent binding to a substrate via radical process. In the following specific reaction scheme (5), the pendant group is an ethylenically unsaturated (vinyl) group which can be bound to the support substrate under free radical activation conditions.

Scheme (5). Synthesis of the amino and styryl [2.2.2] cryptands via radical addition of 2-aminoethanethiol hydrochloride to allyl derivatized [2.2.2] cryptand.

Referring specifically to reaction scheme (5), an allyl derivative of [2.2.2] cryptand 1 is first formed by known chemistry as described above. Then, it is covalently bound to the HSR reagent (2-aminoethanethiol hydrochloride) through the allyl group to form a terminal amino group R, such as by free radical conditions such as the exposure to UV or other irradiation and/or by addition of peroxides, azo compounds, etc., e.g., as illustrated in the review of Griesbaum, K., *Angew. Chem. Internat. Edit*, Vol. 9, No. 4, 273–287 (1970). Thereafter, amino group R is converted to a function capable of binding to a substrate under free radical conditions e.g., a vinyl group. As illustrated in the reaction scheme (5), the first step of this conversion is the interaction of amino cryptand 2 with 4-vinylbenzaldehyde. A Schiff base is the intermediate product of this reaction (not shown on the scheme). On the second step, Schiff base is reacted in situ with $NaBH_4$ to give [2.2.2] cryptand 3 functionalized with polymerizable styryl moiety. This approach allows ready conversion of macrocycles into functionalized molecules for their further covalent attachment or incorporation into or onto various substrates using free radical process such as grafting and coating.

In the foregoing description, C is functionalized by free radical addition of thiols (schemes (4) and (5)). Advantages of this process include the following:

1. Synthesis of allyl cryptand 1 described in prior art is the superior method to build the macrocyclic framework of [2.2.2] 1 cryptand having pendant function for further attachment. The use of allyl group alleviates the need for protection/deprotection steps during the synthesis of the cryptands. Most of the prior art examples of cryptand functionalization are based on protected intermediates with longer routes for their synthesis effecting the total outcome of the process. The method developed on a base of the allyl precursor allows 100–200 g scale production of the functionalized [2.2.2] cryptand. This is unusually large amount for all described methods of the cryptand synthesis.

2. The methods for a conversion of allyl cryptand to more reactive functional molecules are limited. For instance, the authors who first synthesized [2.2.2] allylic cryptand failed to convert the allyl group to hydroxy group. The thiol addition was found very effective for chemical transformation of relatively inert allyl group to reactive amine. The amino group itself is highly efficient for the functionalization of the substrates, however the requirements for the anion exchange stationary phases are in favor of the materials functionalized under conditions of radical polymerization.

3. Allylic group has lower reaction ability compared to styrenic fragment under conditions of radical polymerization. Thus, allylic monomers very often do not provide the required grafting efficiency and lead to low capacity stationary phases. The developed thiol addition allowed efficient transformation of the allyl group to styrenic moiety via two step process (5). Allylic cryptand 1 converted to a styrenic derivative 3 now can be efficiently grafted from the surface of the support providing novel high capacity anion exchange stationary phase.

4. Chemical stability of the stationary phases used in ion exchange chromatography is of great importance. The extreme pHs at which the ion exchange chromatography is performed impose considerable limitations on chemistry of the functional monomers and linkers connecting the ion exchange sites with the stationary phase. The developed thiol addition method followed by grafting polymerization provides extremely stable anion exchange materials on a base of the cryptand functionalized resins. These stationary phases can be operated at pH 1–14 at elevated temperatures. The ruggedness and reproducibility of these phases after subjecting them to such harsh conditions are superior to similar characteristics of the existing anion exchange materials.

In the reaction scheme (5), the illustrated R group is $NH_2$ which reacts to form styrenic [2.2.2] cryptand 3 in which the pendant vinyl group can form a covalent bond with a corresponding vinyl group on a copolymer resin support substrate under free radical conditions as illustrated in Example 3 and FIG. 1.

One advantage of the foregoing reaction schemes is that individual multiple (e.g., about $4 \times 10^{14}$ to $4 \times 10^{16}$ or more) strands of derivatized macrocycle compounds (e.g., cryptands) per square meter can be bound to each support particle and projecting therefrom as illustrated in FIG. 1. This provides a substantial quantity of macrocycle compounds in a format which is readily accessible to the approach of both cationic and anionic species in an aqueous environment. Prior art based on adsorbed macrocycle compounds provides very limited capacity due to the restriction that this species must be adsorbed as a monolayer on a hydrophobic surface. Presenting the macrocycle compounds as a brush polymer extending into the aqueous solution surrounding each support particle, permits significantly better diffusion kinetics than can be observed with adsorbed monolayer coatings of macrocycle compounds while at the same time allowing for significantly higher capacity than is possible with an adsorbed monolayer coating. Furthermore, positioning the macrocycle compounds in the proximity of a hydrophobic surface compromises the chromatographic performance of materials based on adsorbed macrocycle compounds. Anionic hydrophobic compounds exhibit poor chromatographic efficiency when that retention site is located in the proximity of a hydrophobic surface unless organic solvent is added to the mobile phase. Of course, incorporating an organic solvent into mobile phase flowing past the support particles is incompatible with the prior art adsorbed monolayer coatings because such organic solvent will slowly wash the adsorbed coating away. While the composite material derived from support particles which had been covalently derivatized with macrocycle brush polymers are compatible with organic solvents, the high cost of organic solvents and the high cost of disposal of organic solvents make the use of organic solvents highly undesirable. Thus, the brush polymer configuration described above provides superior chromatographic properties without the need for the addition of organic solvent and the incumbent disadvantages of its use.

Adsorbed macrocycle monolayer coatings of the prior art have been shown to be useful with macrocycle ion binding constants as low as 60. However, surprisingly similar macrocycles when constructed in the form of a covalently attached brush polymer coating failed to exhibit any useful ion binding characteristics in 100% aqueous environments. Apparently, applying a macrocycle as an adsorbed monolayer coating on a hydrophobic surface exposes the macrocycle to a substantially lower dielectric environment than the aqueous environment above the surface. As such, ion binding affinities of adsorbed monolayer coatings are substantially higher than the equivalent macrocycle in a 100% aqueous environment. Therefore, in order to produce a useful material in the highly desirable covalently bound brush polymer format, macrocycles must have higher ion binding constants in order to provide useful ion binding characteristics in 100% aqueous environments.

The vinyl moiety of the styrenic terminal group is readily attached under free radical conditions to polymeric substrate particles including terminal groups with ethylenic unsaturation as described in U.S. Pat. No. 5,865,994 to form structure (3).

In the specific two-step reaction (scheme 5) discussed above for bonding R to the macrocycle, R is illustrated in the form of an amine converted to an unsaturated carbon-carbon bond, specifically a vinyl group. Other terminal functional groups may be employed so long as they can be covalently bonded to a desired support substrate.

According to the invention, one useful effective composition is a derivatized macrocycle compound with sufficient ion exchange properties to separate charged molecules. A particularly effective derivatized macrocycle compound of this type is a cryptand bound to a support substrate with anion exchange properties. By anion exchange properties is meant the capability of performing anion exchange chromatography. Cryptands are particularly effective for anion separation because they provide ion binding characteristics sufficient for binding alkaline and alkaline earth metals under alkaline conditions and yet readily release these ions under acidic conditions, providing a convenient means of converting the cryptand from one alkali metal form to another. *Comprehensive Supramolecular Chemistry* Vol. 1–10, Jean-Marie Lehn—Chairman of the Editorial Board, 1996 Elsevier Science Ltd; Izatt, R. M., et al., *Chemical Reviews* 91:1721–2085 (1991)). Significantly higher affinity of the cryptands to alkaline metal ions as compared to the same property of the crown ethers for instance, provides better ion retention characteristics to the anion exchange stationary phases functionalized with the cryptand modifiers. In fact, due to low capacities of the crown ether based materials they are impractical for use as the anion exchange chromatographic phases with 100% aqueous eluents. Most of the industrial applications for ion exchange chromatographic processes are developed with the aqueous eluents, therefore the cryptand functionalized materials are superior to other known metal ion complexing agents.

The anion exchange capacity of the above cryptand-grafted resin can range from about 15 to 2000 microequivalents per gram with a preferable range from about 100 to 300, more preferably from about 120 to 225 and yet more preferably from about 150 to 200 microequivalents per gram.

One suitable support particle is a macroporous polymeric resin, e g, vinylbenzene ethylene, cross-linked with divinylbenzene. Suitable macroporous resins are illustrated in U.S. Pat. No. 4,224,415.

In another embodiment of the invention, a hydrophilic layer may be attached to Z which forms the covalent attachment with the derivatized macrocycle. This has the advantage of reducing hydrophobic interaction between hydrophobic analytes and the surface to which the macrocycles are covalently attached. This reduces the need for addition of solvent to the mobile phase which as noted above is undesirable. Suitable procedures are set forth in Examples 3 and 5.

The foregoing description illustrates functionalizing the cryptand to include unsaturation for covalent binding to Z by a thiol reaction. However, such functionalizing can also be accomplished by other. Other elements besides sulfur can be attached to unsaturated carbon-carbon bonds under proper conditions of radical initiation. These elements are silicon and germanium atoms having at least one hydrogen atom bound to them directly. Substituted carbons, for example, halogenated carbons can also be added to unsaturated carbon-carbon bonds via radical process. Elements mentioned above can be a part of the molecular structure (1) where sulfur is substituted for one of these elements bound directly or indirectly to R.

All patents and publications referred to herein are incorporated by reference.

Further details of the invention are illustrated in the following non-limiting examples.

EXAMPLE 1

This example describes a two-stage synthesis of a derivatized cryptand according to reaction scheme (5).

Methods for Derivatization of Allyl Cryptand 1
Procedure for the Synthesis of Cryptands 2 and 3
Scheme (5)

The procedure for the synthesis of allylic [2.2.2] cryptand is based on the reported method (Babb, D. A., et al., *Journal of Heterocyclic Chemistry* 23:609–613 (1986)). 12 g of allyl-derivatized cryptand was dissolved in 70 ml of ethanol and 12 g of 2-aminoethanethiol hydrochloride was added to the reaction mixture. Reactor was purged with nitrogen. Solution was brought to reflux and 65 mg of AIBN was added. UV irradiation at 254 nm wave length was applied. Reaction mixture was stirred under reflux and irradiated for eight hours. After every two hour period, a new portion of AIBN (65 mg) was added to the reaction mixture. Reaction is being monitored using TLC on neutral aluminum oxide and $CH_2Cl_2$/THF/MeOH; 10/5/1 as eluent.

Solvent was evaporated under reduced pressure. The rest was dissolved in 100 ml of water. Lithium hydroxide was added to the aqueous solution to reach pH 11. The resulted solution was extracted three times with 100 ml of dichloromethane. Organic layer was extracted with 20% aqueous lithium hydroxide and water and dried over anhydrous sodium sulfate. After evaporation of the solvent, crude aminocryptand 2 was dissolved in 200 ml of methanol. To resulted solution, 12 g of 4-vinylbenzaldehyde in 40 ml of methanol was added over a 1 hour period. Reactants were refluxed in methanol for 6 hours in presence of 10 mg of 4-t-butylcatechol. Methanol solution was filtered and cooled down to −5° C. 10 g of sodium borohydride was added slowly to resulted solution. The reaction was continued under reflux for 24 hours. Methanol was evaporated under reduced pressure and the residue was mixed with 80 ml of water; pH was brought to 1.5 with ice cold 30% methanesulfonic acid. The resulted solution was extracted three times with 150 ml of ether. Aqueous layer was brought to pH 11 with lithium hydroxide and extracted three times with 100 ml of dichloromethane. Combined organic fractions were extracted with water, dried over sodium sulfate and filtered. Solvent was evaporated under reduced pressure.

EXAMPLE 2

This example describes functionalizing the support substrate Z by depositing a hydrophilic layer for binding to a derivatized cryptand.

Hydrophilic Layer Formed on Surface of Polymeric Particles Suitable for Grafting of Cryptand Monomer 2.3 g of a dried 55% cross-linked macroporous resin (substrate is ethylvinylbenzene cross-linked with 55% divinylbenzene, resin preparation described in U.S. Pat. No. 4,224,415) was dispersed in 3.3 g of tertiary butyl alcohol (Fluka). To this slurry was added 0.37 g of vinylbenzylacetate made in house, 1 g of vinylacetate (Aldrich) and 0.092 g of Vazo 64 initiator (Dupont). The entire material was dispersed homogeneously and then placed in an oven at 60° C. for 18 hours. The resultant polymeric material was washed with water, acetone, water and finally with acetone. After hydrolysis, this material is now ready for grafting with a cryptand monomer as shown in Example 3 below.

EXAMPLE 3

This example describes binding of the derivatized cryptand of Example 1 to the functionalized Z of Example 2.

Cryptand Monomer is Attached to Polymeric Particles Suitable for Use as a Packing 2.35 g of a dried 55% cross-linked macroporous resin with preformed hydrophilic layer (substrate is ethylvinylbenzene cross-linked with 55% divinylbenzene, resin preparation described in U.S. Pat. No. 4,224,415) was dispersed in 3.4 grams of water and 0.5 g of 0.1 M methanesulfonic acid was added. To this slurry was added 0.5 g of cryptand monomer and 0.2 g of azobiscyanopentanoic acid (Fluka). The entire material was dispersed homogeneously and then placed in an oven at 50° C. for 20 hours. The resultant polymeric material from above was washed with acetone followed by methanol, water, and IM potassium hydroxide. The resin was then packed in an analytical column using standard methods and apparatus at 6000 psi for 15 minutes. This polymeric column is suitable for chromatographic separations of anionic species.

EXAMPLE 4

Cryptand Monomer is Attached to Polymeric Particles Which Have No Hydrophilic Layer Pre-Attached In this example, the derivatized cryptand of Example 1 is bound to the macroporous resin starting material of Example 2 (without forming the hydrophilic layer).

EXAMPLE 5

Alternate Hydrophilic Layer Formed on Surface of Polymeric Particles Suitable for Grafting of Cryptand Monomer 2.3 g of a dried 55% cross-linked macroporous resin (substrate is ethylvinylbenzene cross-linked with 55% divinylbenzene, resin preparation described in U.S. Pat. No. 4,224,415) was dispersed in 3.3 g of tertiary butylalcohol (Fluka). To this slurry was added 2.4 g of vinylbenzylacetate (made in house), 0.092 g of Vazo 64 initiator (Dupont). The entire material was dispersed homogeneously and then placed in an oven at 60° C. for 18 hours. The resultant polymeric material was washed with water, acetone, water and finally with acetone. After hydrolysis, this material is now ready for grafting with a cryptand monomer as described in Example 3 above.

EXAMPLE 6

This example shows the selectivity changes that can be accomplished by changing the eluent cation (mobile phase).

Capacity vs. Cation Form

The conditions for these chromatograms shown in FIG. 2 are: Eluent: 70 millimolar for each case, fig. A potassium, FIG. B sodium, FIG. C lithium; flow rate, 1.0 mL/min; injection volume, 25 µL; temperature, 35 deg C.; Detector, Suppressed Conductivity, ASRS®-ULTRA 4-mm, External Water mode with Anion trap column (4×35 mm); Peaks:1. Fluoride,2 mg/L; 2. Chloride, 3 mg/L; 3. Sulfate, 5 mg/L; 4. Nitrite, 10 mg/L; 5. Bromide, 10 mg/L. The column was a cryptand column of the type described in the examples with dimensions of 4 mm I.D.×250 mm length. The particle size was 10 micron.

EXAMPLE 7

This example shows adjustment of capacity during an analysis by using a higher capacity mobile phase at the beginning and then changing to a lower capacity format by either a step change or a gradient. As shown in FIG. 3, the initial mobile phase is sodium hydroxide and then a step change is made to a lithium hydroxide mobile phase, which is a very low capacity form. The first peaks eluting off are low valency polyphosphates and the run ends with the elution of high valency ions. The conditions for Example 7 are as follows:

| Polyphosphates: Capacity Gradient Prototype 3 × 150, 5µ | |
|---|---|
| Eluent: | 30 mM NaOH for 2 minutes, step to 30 mM LiOH |
| Inj. Volume: | 5 µL |
| Temperature: | 35° C. |
| Detection: | Suppress Conductivity ASRS-ULTRA 2-mm External water mode with ATC |
| Sample: | Polyphosphoric Acid 0.1% |

The benefit of this approach is that it allows one to elute very high valency ions without having to increase the mobile phase ionic concentration. The total ionic concentration throughout the run is only 30 mM, a relatively low concentration. This technique is known as "gradient capacity ion chromatography" (Lamb, et al. (Editors), "Variable Capacity Columns for Gradient Elution Anion Chromatography Based on Macrocyclic Complexes," *Advances in Ion Chromatography*, Vol. 2, Century International, Franklin, Mass., pp 215–231 (1990); Lamb and Smith, "Review: Application of Macrocyclic Ligands to Ion Chromatography," *J. Chromatogr.* 546:73–88 (1991)).

Traditional anion exchange columns require very high concentration mobile phases when analyzing polyvalent ions such as polyphosphates, oligosacharrides, oligonucleotides, etc. The concentrations needed sometimes exceed the ability of a suppressor to suppress. By using a cryptand-based column one can eliminate large baseline changes often seen with steep gradients or step changes with conventional approaches.

What is claimed is:

1. A method for making a cryptand ion exchange composition comprising:
covalently bonding unsaturated carbon to carbon moieties pendant from a derivatized ion binding cryptands with unsaturated carbon to carbon moieties pendant from a support substrate under free radical activation conditions to form covalent bond.

2. The method of claim 1 in which said cryptand pendant carbon to carbon moiety is on a styrenic group.

3. The method of claim 1 in which said derivatized cryptand is the only ion binding moiety bound to said polymeric substrate.

4. The method of claim 1 in which said ion exchange composition comprises multiple cryptands projecting from each of said support substrates as strands of a brush polymer, said ion exchange composition having an ion binding constant of at least about 1000 in water.

5. The method of claim 1 in which said ion exchange composition comprises multiple cryptands projecting from each of said support substrates as strands of a brush polymer, said support substrates being in the form of a particulate resin bed comprising a chromatographic separation packed bed.

6. The method of separating anions in a liquid sample comprising flowing said liquid sample through a flowthrough bed of ion exchange composition made by the method of claim 1 to separate said anions.

7. The method of separating anions in a liquid sample comprising flowing said liquid sample through a flowthrough bed of ion exchange composition made by the method of claim 2 to separate said anions.

8. The method of separating anions in a liquid sample comprising flowing said liquid sample through a flowthrough bed of ion exchange composition made by the method of claim 3 to separate said anions.

9. The method of separating anions in a liquid sample comprising flowing said liquid sample through a flowthrough bed of ion exchange composition made by the method of claim 4 to separate said anions.

10. The method of separating anions in a liquid sample comprising flowing said liquid sample through a flowthrough bed of ion exchange composition made by the method of claim 5 to separate said anions.

* * * * *